3,407,215
CATALYTIC FLUID BED OXIDATION OF
O-XYLENE TO PHTHALIC ANHYDRIDE
Robert B. Egbert and Faust Frederick Oricchio, Stamford, and Thomas J. Gluodenis, Waterbury, Conn., assignors to Chemical Process Corporation, Stamford, Conn., a corporation of Massachusetts
Filed June 28, 1965, Ser. No. 467,538
14 Claims. (Cl. 260—346.4)

ABSTRACT OF THE DISCLOSURE

Production of phthalic anhydride by fluid bed catalytic air oxidation of o-xylene in which a bromine promoter is used in the vapor phase together with a $$V_2O_5\text{—}SO_3\text{—}K_2O$$

Figure 1:
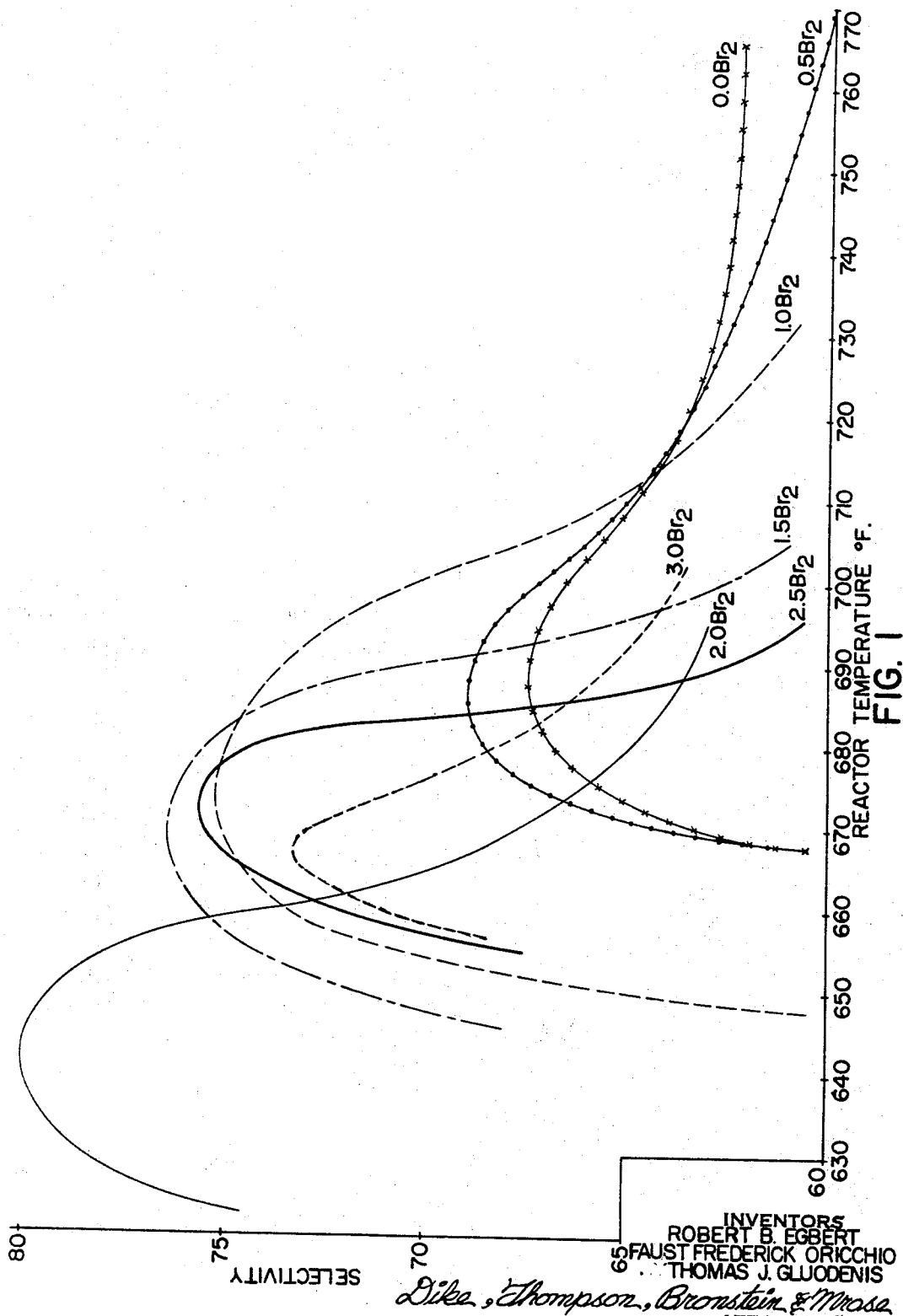

catalyst on a highly porous silica support having a surface area greater than 450 m.$^2$/g. and a pore diameter less than 100 A. and greater than 25 A. whereby yield, selectivity and catalyst loading are substantially increased.

---

The present invention relates to a method for the vapor phase, catalytic oxidation of o-xylene to phthalic anhydride (hereinafter referred to as PAA) with an oxygen containing gas, particularly air, in a fluidized low temperature catalytic bed.

Most PAA made commercially by vapor phase catalytic oxidation is made by oxidation of naphthalene with air. The trend during the last ten years has been towards large installations employing fluid catalytic beds.

It has been recognized for some time that the production of PAA by the vapor phase oxidation of o-xylene rather than naphthalene would be economically advantageous due to the much lower cost of o-xylene in many cases.

However, the only commercial production of PAA by the vapor phase oxidation of o-xylene has been with a fixed bed catalyst, but this has the disadvantage of requiring individual reactors of small capacity and exceedingly high air ratios, e.g. 30 to 1 by weight and higher. High air to feed ratios present difficulties in recovery of the PAA and high installation and operating costs. Furthermore, individual reactors of small capacity further increase investment costs in large installations.

It has been long recognized that the use of a fluidized catalytic bed such as is used in the vapor phase oxidation of naphthalene would be highly desirable for the vapor phase oxidation of o-xylene to PAA in order to eliminate the aforesaid disadvantages of fixed catalytic beds. However, until the present invention, no one has succeeded in finding a commercially feasible way of doing this, although a number of attempts have been made.

The basic problem has been that with the fluidized bed technique using the catalysts conventionally used for the vapor phase oxidation of naphthalene, the yields of PAA from o-xylene are too low for commercial feasibility. The reason for this is that the fluidized catalysts most suited for the vapor phase oxidation of naphthalene promote the oxidation and ultimate severance of the benzene ring when used for the vapor phase oxidation of o-xylene under reactor conditions required for reasonable conversion of the o-xylene. This results in the formation of CO, $CO_2$ and maleic anhydride at the expense of PAA. Essentially, then, the problem resides in poor selectivity in oxidation of both methyl carbons of the o-xylene as distinguished from the ring carbons under the conditions required for reasonable conversion of the o-xylene. Selectivity is defined as the ratio of oxidized o-xylene in which the methyl carbon or carbons of the o-xylene have been partly or wholly oxidized but neither of them removed but in which the benzene ring of the o-xylene remains intact, to the total o-xylene converted.

The present invention for the first time provides a commercially feasible method for the catalytic, vapor phase oxidation of o-xylene to PAA with an oxygen containing gas, particularly air, in a fluidized catalytic bed in which high PAA yield and high selectivities are achieved.

This is achieved in accordance with the present invention by carrying out the reaction at relatively low temperatures and with relatively low air to o-xylene ratios in the presence of one or more of a particular class of reaction promoting agents in the vapor phase together with a particular class of porous silica-supported vanadium oxide catalysts. The promoting agent in the presence of such catalysts promotes the selective oxidation of the methyl carbons of the o-xylene to form phthalic anhydride at relatively low temperatures and at relatively low air ratios thereby providing high PAA yields and selectivities. Selectivities and yields are increased partially because the promoting agent permits the use of lower reaction temperatures with the particular catalyst, it being recognized that the higher the reaction temperature the greater the attack on the benzene ring. The presence of such promoting agent with the particular catalysts of the present invention is not only selective in reducing oxidation of the benzene ring to a minimum, but it is also selective in suppressing oxidation of the o-xylene to benzoic acid and to incomplete oxidation products such as phthalide, o-toluic acid and o-tolualdehyde at the relatively low reaction temperatures used.

The promoting agents of the present invention are selected from the group consisting of elemental bromine, hydrogen bromide and other bromine compounds which have the property of dissociating into bromine or HBr at reactor conditions.

The use of bromine and bromine compounds in the vapor phase catalytic oxidation of a large variety of aromatic and alkyl aromatic compounds, including benzene, naphthalene and o-xylene, to a large variety of oxidation products, including phthalic anhydride and maleic anhydride, has been suggested in U.S. Patent No. 2,954,385, filed Oct. 2, 1957. This patent refers to the benefits of using such compounds in fixed as well as fluidized catalytic beds, and among a large variety of classes of catalysts it refers to unsupported vanadium oxide and also to vanadium oxide supported on a large variety of porous and non-porous supports, including silica. The use of large air/o-xylene ratios, relatively high temperatures, and very short contact times typical of fixed catalytic beds, are disclosed.

This disclosure has been of no help, but rather has been detrimental in the discovery of a commercially feasible method of vapor phase, fluid bed catalytic oxidation of o-xylene to PAA because the use of bromine and bromine compounds with the particular vanadium oxide catalysts disclosed provide no discernible improvement over the PAA yield and selectivity achieved without the bromine, which are too low for commercial practicability. Furthermore, the relatively high air ratios taught by this patent present the aforesaid problems referred to with respect to the fixed bed processes. Also it has been found that the presence of bromine has no effect, and in some cases a negative effect, on yield in the vapor phase, fluid bed oxidation of benzene and naphthalene. Furthemore, as the temperature of reaction and air/o-xylene ratio are increased to the temperatures and ratios disclosed in this patent, the benefits of bromine and bromine compounds in promoting selective oxidation of o-xylene to PAA decrease sharply, even with the catalysts of the present invention. Although this patent recommends porous catalyst supports with bromine compounds for ring rupturing oxidations and non-porous catalyst carriers for oxidation of alkyl side chains, it has been found that satisfactory results cannot be achieved in the vapor phase, fluid bed oxidation of o-xylene to PAA by the use of bromine promoters with non-porous supports or even porous supports lacking certain properties. In fact, it has been found that the use of bromine additives is effective only with catalysts having certain unique properties.

The particular class of fluid catalysts contemplated by the present invention and with which the bromine promoting agents are effective, consists essentially of vanadium oxides, particularly vanadium pentoxide and tetroxide, fluxed with a compound of $SO_3$ and alkali metal oxide.

The catalyst is supported on a highly porous, hydrated, amorphous, particulate silica support, i.e., silica gel particles, having a surface area of not substantially less than 450 square meters per gram and a mean pore diameter which is not substantially less than 25 to 30 Angstrom and which is preferably less than 100 Angstrom, and more preferably less than about 80 to 90 Angstrom.

The catalyst surface area of the supported catalyst is preferably greater than about 100, more preferably greater than 160, square meters per gram for an equilibrium supported catalyst formed by applying the catalyst to solid particles of the silica and is preferably greater than about 40 or 45, more preferably greater than 60, square meters per gram for an equilibrium supported catalyst formed by adding the catalyst to the silica prior to its formation into solid particles.

Silica gel for catalyst supports are usually manufactured in two ways. In one, the silica gel is formed and dehydrated into a dry mass which is crushed to desirable particle size consist. In the other, the soild silica gel particles are formed in discrete microspheres of the desired size consist, as for example, by spray drying. In either of these methods, the catalyst usually can be added prior to the formation of the solid silica or alternately can be applied to the formed solid silica particles. In the former case, the catalyst is distributed throughout the particles in a much more uniform manner than in the latter case. In the latter case, the concentration decreases from the exterior of the particles to their interior.

Equilibrium supported catalyst refers to the supported catalyst after the catalyst system has reached equilibrium conditions under the particular reactor conditions used. This may take more than thirty days of operation.

The molar ratio of the $SO_3$, alone or together with another or other strongly acidic non-metallic oxides, to alkali metal oxide, should be greater than about 1.7 or 1.8 in the equilibrium catalyst. A non-metal oxide is considered strongly acidic if, under reactor conditions, it has a markedly greater affinity for combining with alkali metal oxide to form stable compounds than have vanadium oxide and any other oxide present in the catalyst of a valence changing metal or metals falling within Groups V–$b$ and VI–$b$ of the Periodic Table of Elements. Preferably, there are no significant amounts of such other non-metallic oxides, an example of which is $P_2O_5$. If such other oxides are present, for example $P_2O_5$, the aforesaid molar ratio should be calculated as mols $SO_3$ plus 3 times the mols $P_2O_5$ divided by mols alkali metal oxide. This ratio should be greater than 1.7 or 1.8. Of course, with other such oxides the dividend of the ratio should be mols $CO_3$ plus the mols of each oxide multiplied by the appropriate valence correction factor. Where the catalyst contains strongly acidic non-metallic oxides other than $SO_3$, the molar ratio of $SO_3$ to alkali metal oxide should at least be greater than 1.3 or 1.4.

The molar ratio of $SO_3$ to alkali metal oxide should preferably be less than 2.2 and more preferably less than 2.0 in the equilibrium catalyst, i.e., after the catalyst system has reached equilibrium conditions. It may be higher in the fresh catalyst so long as it is reduced to less than 2.2 after the catalyst has reached equilibrium conditions.

The molar ratio, in the catalyst, of alkali metal oxide to vanadium oxides plus oxides of other valence changing metals included in Groups V–$b$ and VI–$b$ of the Periodic Table of Elements and uranium, is preferably not substantially less than about 3.3 or 3.4 and, more preferably, not substantially less than about 4.0. Also, such molar ratio should preferably not be substantially more than about 4.75 or 5.2. If this ratio is much greater, the excess inert, fluxing material preempts the limited surface area and pore volume of the carefully prepared support.

Metals other than vanadium included in the aforesaid Groups V–$b$ and VI–$b$ are molybdenum, chromium, tungsten, tantalum and columbium.

A preferred alkali metal oxide is potassium oxide. Although other alkali metal oxides can be included, some of them, such as sodium oxide, when present in certain proportions, tend to lower the fluxing temperature of the catalyst. This effect may in some cases be undesirable. However, in other cases it may not be. Small amounts can be tolerated in most cases.

The vanadium oxides react with or dissolve and/or are finely dispersed in the $SO_3$—$K_2O$ flux to provide a $V_2O_5$—$V_2O_4$—$SO_3$—$K_2O$ catalyst melt which has a limited fluidity and hence mobility on the silica support at reactor conditions. This increases substantially the activity of the vanadium oxides in the fluid catalyst bed at lower temperatures in promoting selective oxidation of the o-xylene to PAA when the oxidation is carried out in the presence of the bromine promoting agents of the present invention.

Both pentavalent and tetravalent vanadium are present in the equilibrium catalyst, since there is a continuous reduction of the pentavalent form and reoxidation of the tetravalent form. Although the original fresh catalyst may be made from pentavalent or tetravalent vanadium compounds, the active equilibrium catalyst under reactor conditions contains both. It is desirable for the active equilibrium catalyst to contain between about 20% or 25% and 60% by weight of the vanadium in pentavalent form. An unexpected effect achieved by using the bromine promoters of the present invention with the particular class of catalysts contemplated by the invention is that the proper balance between pentavalent and tetravalent vanadium can be maintained in the catalyst bed at reactor conditions at relatively low temperatures and air to o-xylene ratios.

German Patent No. 1,144,709 discloses a method for the vapor phase, fluid bed oxidation of o-xylene to PAA in which bromine and bromine compounds are used with porous silica gel-supported vanadium and molybdenum oxide catalysts and in which the vanadium and molybdenum oxides are fluxed with $K_2S_2O_7$ and $Na_2S_2O_7$ to cause the fluxed catalyst to exist as a semi-fluid melt at reaction conditions. Catalyst activators are also included in the catalysts. Although the method disclosed in the German patent increases yield and selectivity, they are not increased sufficiently and operating difficulties are inherent in the method, so that the method of the German patent is not commercially practicable either. The lower selectivity achieved in the German method is evidenced by a relatively high yield of maleic anhydride and carbon oxides at the expense of PAA. The reason for this is that the German patent does not disclose the proper catalysts and catalyst supports individually or in combination, which are necessary to obtain the advantages of the bromine additive achieved by the present invention. The German patent in particular fails to recognize the necessity of properly matching catalyst properties with the properties of the catalyst support. From the point of view of the catalyst support, the surface area and pore volume of the silica gel in the German patent are too low to retain a sufficient amount of the catalyst melt in the pores together with a sufficient catalyst surface area and pore volume in the supported catalyst under reactor conditions to make the bromine additive adequately effective in promoting selective oxidation of the methyl carbons of the o-xylene. Accordingly, yield and selectivity are reduced and the minimum contact time for reasonable conversion of o-xylene is lengthened. The relatively low capacity of the German catalyst support to retain catalyst melt at reactor conditions is also in part responsible for a tendency of the supported catalyst particles to stick together, thereby further reducing yield and selectivity. Furthermore, the rates of o-xylene feed per unit weight of vanadium oxides plus oxides of other metals in Groups V–b and VI–b of the Periodic Table are exceedingly low, which results in unattractively low reactor capacities and in difficulties in reactor design and in operation of the fluid catalyst bed. In addition, the German patent fails to appreciate that the molar ratio of alkali metal oxide to vanadium oxides and oxides of other valence changing metals in Groups V–b and VI–b of the Periodic Table of Elements and uranium should preferably be not less than 3.3 or 3.4 and not more than 4.75 or 5.2 to achieve optimum effectiveness of the bromine additive. It is believed that one of the reasons the German patent fails to disclose the proper catalyst-support combinations to achieve satisfactory results is its failure to appreciate that the bromine additive does not react with the catalyst in promoting the selective oxidation of the methyl carbons of the o-xylene but rather acts transiently and directly in the vapor phase on such methyl carbons, which leads to a different reaction mechanism occurring on the catalyst surface.

The supported catalyst of the present invention in conjunction with the bromine promoters of the present invention avoids these difficulties and, accordingly, for the first time, provides a commercially practical method for the vapor phase, fluid bed oxidation of o-xylene to phthalic anhydride. In accordance with the invention, yields as high as 115 lbs. of phthalic anhydride per 100 lbs. of o-xylene in the feed and selectivities as high as 83 mols per mols of o-xylene converted, have been achieved at temperatures below 700° F. and with air to o-xylene ratios of between about 9/1 and 12/1. This exceeds the best yields obtained in the vapor phase fluid bed catalytic oxidation of naphthalene to phthalic anhydride.

By increasing the surface area of the catalyst support to not less than 450 m.²/gram to thereby increase the pore volume while maintaining the pore diameter at not less than 30 Angstrom and preferably less than 80 to 90 Angstrom, by controlling the molar ratio of alkali metal oxide to vanadium oxides to not substantially less than 3.3 or 3.4 and not substantially more than 5.2 and by controlling the ratio of catalyst to support in the supported catalyst, retention of optimum amounts of catalyst is achieved together with optimum catalyst surface area and pore volume of the supported catalyst at reactor conditions for optimum effectiveness of the bromine promoter. Accordingly, the aforesaid high yields and selectivities can be achieved.

It has been found that the greater the surface area of the catalyst support for any given useful pore diameter, the greater the catalyst retention power of the support at reactor conditions with the use of bromine promoters. When this is coupled with the increase in the pore volume which results from increasing the surface area of the support, the result is that a greater amount of catalyst can be retained in the pores of the support while preserving a relatively large catalyst surface area of the supported catalyst under reactor conditions. This relatively large catalyst surface area of the supported catalyst increases contact of the gaseous phase with the vanadium oxides of the catalyst to thereby increase selectivity and yield by augmenting the selective oxidation of the methyl groups in cooperation with the bromine promoter. At the same time this ensures maintenance of the proper ratio of pentavalent to tetravalent vanadium.

It has been found that exceedingly large catalyst surface areas of a properly fluxed and hence mobile, highly active vanadium oxide catalyst are required to achieve optimum selectivity with the bromine promoting agent of the present invention and to take full advantage of the peculiar transient manner in which the bromine promoter acts in the vapor phase. The bromine transiently activates the methyl carbons of the o-xylene in the vapor phase for selective catalytic oxidation. The bromine instantaneously becomes tied in some way to the methyl carbons of o-xylene molecules to activate them and then is regenerated so that it is available to activate other methyl carbons of the same or other o-xylene molecules. These reactions must proceed exceedingly rapidly in order to complete oxidation of the methyl carbons of the o-xylene to form highly stable PAA molecules before substantial oxidation of the ring carbons of the o-xylene can occur. This requires exceedingly large surface areas of an extremely active and well fluidized catalyst. Futhermore, this requires minimum dilution of the vapor phase consistent with the minimum oxygen partial pressures to maintain the proper pentavalent to tetravalent vanadium ratio.

The present invention permits the achievement of rates of o-xylene conversion per unit weight of vanadium plus molybdenum oxides incorporated in the catalyst of from 5 to 10 times greater than those taught in the aforesaid German patent.

Preferably, the silica-gel support has a maximum surface area and port volume. However, the maximum surface area is limited by the fact that the supported catalyst must be mechanically strong enough to resist excessive attrition into fine particles during operation. In most cases, the maximum surface area of the support will be about 800 square meters per gram. If the surface area of the support is reduced to substantially less than about 450 square meters per gram, satisfactory results are not achieved. A preferred surface area is from 600 to 750 square meters per gram.

With any given pore diameter of the support, maximum surface area will provide maximum pore volume. Maximum pore volume is preferred because it is a measure of the amount of catalyst the support can hold while still retaining adequate catalyst surface area and pore volume of the supported catalyst. However, again maximum pore volume is limited by the fact that the supported catalyst must resist excessive attrition. Furthermore, neither the surface area not pore volume of the support should be so great as to decrease the mean pore diameter of the support below the minimum at which the fluxed catalyst can flow into the pores and along the surface area thereof by molecular film flow at reactor conditions or to a point at which the catalyst surface area and pore volume of the supported catalyst become too small for adequate mass transfer effects, i.e., at which the pores of the support become overloaded with catalyst at reactor conditions. For example, as the mean pore diameter of the support approaches twice the catalyst film thickness, then the surface area and pore volume of the supported catalyst under reactor conditions rapidly approach zero. In the range of pore diameters contemplated by this invention, a preferred pore volume for the support is from about 0.5 to 1.0 cc. per gram of support. Above 1.0 cc. per gram attrition may become a problem and below 0.5 it is difficult to load the support with enough catalyst without overloading, i.e., without unduly decreasing the catalyst surface area and pore volume of the supported catalyst.

The minimum mean pore diameter has been discussed above and should not be substantially less than 25 or 30 Angstrom. It must be small enough, however, to retain the catalyst melt in the pores of the support at reactor conditions. Both minimum and maximum mean pore diameter depend to some extent on the fluid properties of the catalyst under the reactor conditions used. As aforesaid, the mean pore diameter should preferably be less than 100 Angstrom and more preferably less than 80 or 90 Angstrom.

In summary, since the pore volume of the silica support is equal to the mean pore diameter times the pore surface area, it is apparent that the minimum pore diameter dictates the maximum surface area and pore volume, taking into account the fact that the walls of the support cannot be made so thin that excessive attrition occurs in the fluid bed under reactor conditions.

For any given silica gel support contemplated by the present invention, the ratio of catalyst to silica gel is controlled so as not to overload the pores of the support while at the same time providing sufficient catalyst to coat or cover the relatively large surface area of the support. As aforesaid, if the carrier becomes overloaded, the catalyst surface area and pore volume of the supported catalyst are reduced to such an extent that yield and selectivity are reduced. Also the supported catalyst particles tend to become sticky as the pores become overloaded. Thus, the proper ratio of catalyst to support depends on the nature of the support, e.g., the pore volume, the pore diameter, the surface area, and whether the supported catalyst is formed by applying the catalyst to solid particles of the silica or by adding the catalyst to the silica prior to its formation into solid particles. A preferred amount of catalyst with a support having a surface area of from 450–800 square meters per gram, a pore volume of from 0.5 to 1.0 cc. per gram and a pore diameter between 30 Angstrom and 80 Angstrom is between about 25 and 40 or 45% by weight of the combined catalyst and support in the case of a supported catalyst formed by applying the catalyst to the solid silica particles and is between about 30 or 35% and 50 or 55% in the case of a supported catalyst formed by adding the catalyst to the silica prior to its formation into solid particles. A preferred maximum in the former case is between about 30 and 40% and in the latter case between about 40 to 50%. Excellent results have been achieved in the former case with 27%.

As aforesaid, the catalyst surface area of the equilibrium supported catalyst should preferably be greater than 100, more preferably greater than 160, m.²/gram for the equilibrium supported catalyst formed by applying the catalyst to the solid silica particles and should preferably be greater than about 40 or 45, more preferably greater than 60, m.²/gram for an equilibrium supported catalyst formed by adding the catalyst to the silica prior to its formation into solid particles. Preferred surface areas of the freshly prepared, i.e., unused, supported catalyst of the former type are between 200 and 500 square meters per gram and for the equilibrium supported catalyst of the latter type they are between 175 and 230 or 250 m.²/gram. For a freshly prepared supported catalyst of the latter type they are between 65 and 225 m.²/gram. The decrease in surface area with normal use of the latter type of supported catalyst is not significant.

Preferably, the pore volume of the supported equilibrium catalyst of the aforesaid former type should not be much less than 0.35 cc. per gram, a pore volume of between 0.4 and 0.5 cc. per gram being the most preferred. The corresponding values for the supported fresh catalyst of the aforesaid former type are a minimum of 0.40 cc./gram and a preferred range of 0.45 to 0.65 cc./gram. In the case of equilibrium supported catalysts of the aforesaid latter type, the pore volume may range between 0.2 and 0.35 cc. per gram, the maximum being preferred. The surface area and pore volume of the fresh supported catalyst, especially that derived from a crushed support, are higher than after it has reached equilibrium mostly because of the attrition and fouling which normally occur in reaching equilibrium.

Preferably the bulk density of the support is from about 0.3 to 0.6 grams per cc. whereas the preferred bulk density of the supported catalyst is between about 0.50 and 0.70 or 0.80 grams per cc.

From 15 to 30% by weight of the particles of the supported catalyst are preferably less than 40 micron size when the catalyst has reached equilibrium. However, this percent of fines may be lower or higher than this range for abnormal size consist, i.e., size distribution. With a supported catalyst derived from a crushed support, normally a smaller amount of the particles are of this size in the fresh catalyst, the amount increasing to this 15 to 30% by weight range during operation due to attrition of the particles.

The inert hydrated amorphous silica support may be a silica gel made by the acidification of sodium or potassium silicate. It may be prepared in the form of microspheres or pulverized dried cake. Various forms of highly porous, hydrated, amorphous silica having a high surface area and pore volume can be used.

The supported catalyst can be made from the solid silica particles by applying the melted $V_2O_5$—$V_2O_4$—$SO_3$—$K_2O$ catalyst to the support, or a solution of the catalyst can be impregnated, followed by dehydrating and heating to cause the catalyst to melt and migrate along the finely porous surface areas of the support to form a film. The silica particles and powdered catalyst may be mixed together, as by tumbling, and the temperature raised to render the catalyst fluid enough to pass into the pores of the silica and along the surface area by film flow. In some cases, only a part of the silica is heavily loaded with catalyst and mixed with unloaded silica. The catalyst migrates from the heavily loaded silica into the pores of the unloaded silica in the first stages of operation during which the supported catalyst reaches equilibrium.

It has been found contrary to the statments made in the aforesaid German and U.S. patents that the presence in the equilibrium catalyst of catalyst activators or conditioners such as oxides and other compounds of cerium, copper, manganese, lead, nickel, cobalt, molybdenum, uranium, silver and tungsten as well as phosphoric acid and phosphates has no advantage and, in some cases, is detrimental with the use of bromine promoters and the class of catalysts contemplated by the present invention. Therefore, it is preferred that the equilibrium supported catalyst of the invention be free from any substantial amounts of these activators or conditioners. These activators or conditioners appear to be essentially inert in the highly active catalyst systems of this invention using bromine promoters. The reason for this is believed to be due to the methyl group activating effect of the bromine promoter and the relatively low reactor temperatures employed in this invention.

A commercially available supported fresh catalyst which has proven highly satisfactory in practicing the method of the present invention after reaching equilibrium in a commercial installation is one which was formed by applying catalyst to a crushed silica support and which has the following typical composition and properties:

$V_2O_5$—4% by weight
$K_2O$—8.3% by weight
$SO_3$—13.8% by weight
Silica gel—73.4% by weight
Molar ratio $SO_3$ to $K_2O$—1.96
Molar ratio $K_2O$ to $V_2O_5$—4.01
Bulk density—36 lbs. per ft.³ or 0.57 grams per cc.
Surface area—250 to 400 square meters per gram (the surface area of the silica gel support to which the catalyst is applied is substantially greater than 600 square meters per gram)
Pore volume—0.45 to 0.60 cc. per gram (the pore volume of the silica gel support to which the catalyst is applied is well above 0.65 cc. per gram)

The size consist of the fresh supported catalyst is as follows:

Micron:

| Through: | Wt. percent |
|---|---|
| 5 | 0.56 |
| 10 | 1.1 |
| 20 | 2.8 |
| 30 | 5.2 |
| 40 | 7.6 |
| 50 | 10.0 |
| 75 | 15.5 |
| 100 | 26.0 |
| 150 | 50.0 |
| 200 | 76.5 |
| 250 | 92.0 |
| 300 | 98.1 |

On:

| 300 | 1.9 |
|---|---|

On reaching equilibrium, about 23 or 24% of the particles are less than 40 microns in size.

The reactor temperature may range from 500° F. or 550° F. to 738° F. or 750° F. but preferably it is advantageous not to exceed 720° F. Above 750° F, the bromine promotor appears to lose most of its unique advantage. It is preferred to operate at as low a temperature as possible consistent with high conversion of o-xylene and commercially practical space velocity. A preferred range is from 600° F. to 700° F., more preferably from 620° F. to 660° F. Excellent results have been achieved, however, on a commercial scale at a temperature of from 670° F. to 690° F. It has been observed that the optimum temperature decreases with increased scale of operation.

The ratio of air to o-xylene may range from 7.5/1 to 20/1 but is preferably between 9/1 and 13/1.

The pressure at the top of the reaction zone may vary from atmospheric to 35 p.s.i.g. or substantially higher if desired. Preferably, this pressure is superatmospheric, e.g. 22 p.s.i.g., for convenience in product recovery. The air fed to the catalyst bed through the grid is under the appropriate pressure to maintain fluidization and is preferably fed to the reaction zone without removing the heat of compression.

The bromine promoter may be elemental bromine, HBr and/or other bromine compounds which are capable of dissociating into elemental bromine or HBr at reactor conditions. Such bromine compounds may be inorganic compounds such as nitrosyl bromide or ammonium bromide, or organic bromides such as ethyl and other lower alkyl bromides, benzyl bromide, acetyl bromide, xylyl bromide, ethylene dibromide, carbon tetrabromide, etc. However, it is preferred to use bromine and/or hydogen bromide.

The amount of elemental bromine or HBr may range from about 01. to 5% based on weight of o-xylene. Above 5%, little additional advantage has been noted. It has been observed that the larger the reactor the smaller the amount of bromine required to achieve optimum results. For example, with small fluidized beds, in going from 1.5 to 4.5 inches in diameter, it has been found that approximately one-third less bromine is required to achieve equivalent selectivity. This was further confirmed in commercial scale tests with larger reactors. In a commercial installation, 1.0% HBr proved highly satisfactory. On the other hand, 0.25% HBr in such commercial installation gave substantial improvement as compared to no bromine as well as substantial improvement over 0.25% HBr in the 1.5 and 4.5 inch diameter reactors. When other bromine compounds are used, additional amounts of combined bromine are usually required. For example, with ethylene dibromide about six times as much combined bromine is required as with elemental bromine and/or HBr. The requisite amount of combined bromine in the other bromine compounds will vary between elemental bromine and ethylene dibromide and, in some instances of less preferred bromine compounds, will be greater than in the case of ethylene dibromide.

The bromine or bromine compound is preferably vaporized or atomized into the warm air at a temperature above the dew point thereof before the air is passed to the reactor but it may be added to the o-xylene feed or directly to the reactor bed. It may be vaporized or atomized into nitrogen which is fed to the warm air stream.

The space velocity of the gases through the fluidized bed depends on the size and design of the reactor but ordinarily it will range between 275 and 400, preferably between 300 and 360, volumes of gas at 70° F. and atmospheric pressure per volume of supported catalyst per hour. It will vary depending on the supported catalyst properties, temperature, unexpanded bed density, unexpanded bed volume, unexpanded bed height and desired contact times.

The linear gas velocity through the bed depends on the same factors as space velocity and ordinarily will range between 0.3 and 2.0, preferably 0.5 to 1.5, feet per second at reactor temperature and pressure and calculated on the basis of the free cross-sectional area of the reactor shell.

The rate of o-xylene feed or supported catalyst loading will again depend on the aforesaid factors but ordinarily will range in commercial size reactors from about 0.025 to 0.07, preferably 0.045 to 0.055, pounds o-xylene per pound of supported catalyst per hour with conversions of o-xylene from 95 to 100%. However, for small experimental reactors below 2 inch diameter, it may be as low as 0.015. On the other hand, a 4½ inch diameter reactor has been operated successfully over a range of 0.029 to 0.062 which is within the commercial range referred to above. A loading of 0.025 is from two to six times the loading disclosed in the aforesaid German patent using 3¼ and 6 inch diameter reactors. On a commercial scale this becomes an extremely important advantage.

Mean contact times of between about 5 and 25 seconds preferably between 7 or 10 and 20 seconds, may be used. The mean contact time depends on the properties of the supported catalyst used, temperature, pressure, space velocity, fluidized bed density and fluidized bed volume.

The o-xylene feed is preferably sprayed into the catalyst bed but it may be vaporized or atomized and then fed into the catalyst bed.

In the examples given below, the fluid or expanded bed height was about six feet, the bed diameter was 1.5 inches and the reaction zone was cooled by means of a circulating system of chlorinated aromatic hydrocarbon fluid. However, any cooling system can be used. The expanded volume of supported catalyst was about 2000 cc. Typically the linear gas velocity through the bed was 0.36 ft./sec., the space velocity was about 350 volumes of gas per volume of supported catalyst per hour and the rate of o-xylene feed was 0.018 pound per pound of supported catalyst per hour.

The entrained catalyst in the exit gases, after partial cooling, was filtered out and returned to the bed. The exit gases were analyzed and measured to obtain selectivities, PAA yields and material balances.

EXAMPLES

Group 1

Examples were carried out with the commercially available supported catalyst, the composition and properties of which have been described in detail above, using a ratio of air to o-xylene of from 7.5/1 to 19/1 and a pressure of 2 p.s.i.g. at the exit of the reactor. The ratio of $SO_3$ to $K_2O$ in the equilibrium catalyst was 1.88. Bromine gas was vaporized into dry nitrogen which was added to the compressed air stream (5 p.s.i.g.) which was introduced into the catalyst bed through the grid. The o-xylene was vaporized and fed into the fluid bed.

The amounts of bromine gas used in these examples were zero, 0.5% by weight based on o-xylene feed, 1.0%, 1.5%, 2.0%, 2.5% and 3%. The reaction temperature was varied from 750° F. to 620° F., usually in increments of 5° to 10°.

Each selectivity value, after operation at a steady level was observed, i.e., after the catalyst had reached equilibrium, was plotted against temperature for each of the bromine concentrations at or near its optimum air/o-xylene ratio and the results are shown in FIG. 1. Selectivity is defined as the total mols of PAA, phthalide and other intermediate oxidation products capable of conversion to PAA (i.e., in which one or more of the methyl groups have been partially or wholly oxidized but not removed from the o-xylene ring but in which the o-xylene ring remains intact), divided by 100 mols of o-xylene converted. As aforesaid, this is a measure of the selectivity of oxidation of the methyl groups to PAA or precursors of PAA as distinguished from decarboxylation, cracking and oxidation of the ring carbons to such products as CO, $CO_2$, maleic anhydride and benzoic acid.

Figure 2:
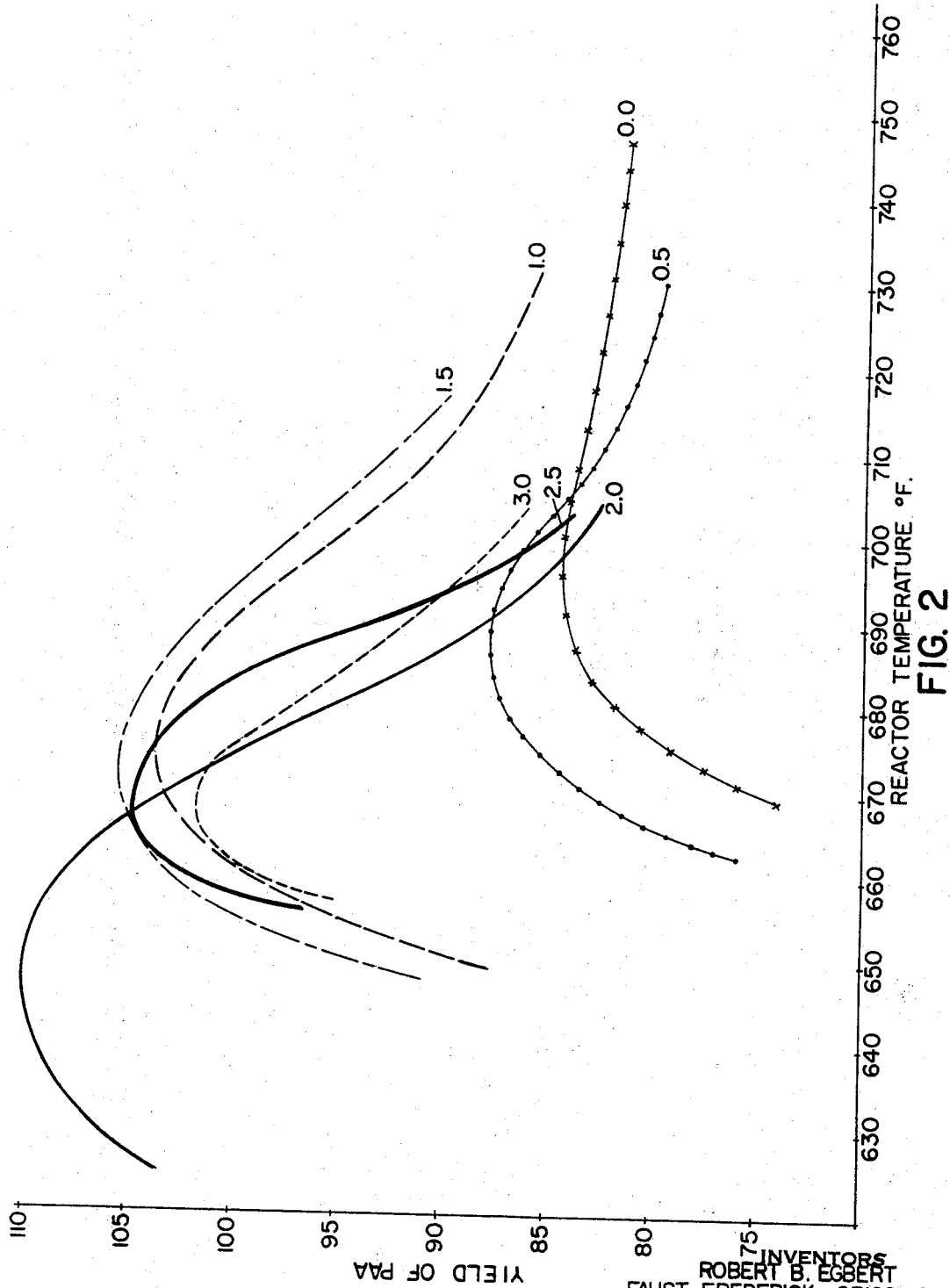

The PAA yields achieved are plotted against temperature in FIG. 2. Yield is defined as lbs. of PAA obtained per 100 lbs. of o-xylene in the feed.

The conversion of o-xylene in most cases was above 98%.

In a commercial scale operation of the method of the present invention substantially 100% conversion of o-xylene has been continuously achieved.

In each case of these examples, the fluidity of the bed was satisfactory. There was no noticeable agglomeration of the supported catalyst particles, no noticeable channeling and no eluviation of fines from the bed.

It is noted that by the use of bromine with the catalyst of the present invention the optimum selectivity was raised from 67.4 to 80 and the optimum yield of PAA was raised from 84.3 to 110.

It is pointed out that the peaks shown in FIGS. 1 and 2 will move to the right or left and up or down and will vary in breadth, depending on the size of the reactor, the air/o-xylene ratios, and the properties of the particular catalyst used. For example, when the size of the reactor is increased, other things being constant, it has been observed that the peaks shift to the left considerably and that less bromine is required to achieve maximum selectivity and yield. Thus, with a 4½ inch diameter reactor, the peaks shifted to the left as much as 30° F. or 40° F. and the high selectivities and yields are obtained with less bromine.

Figure 3:
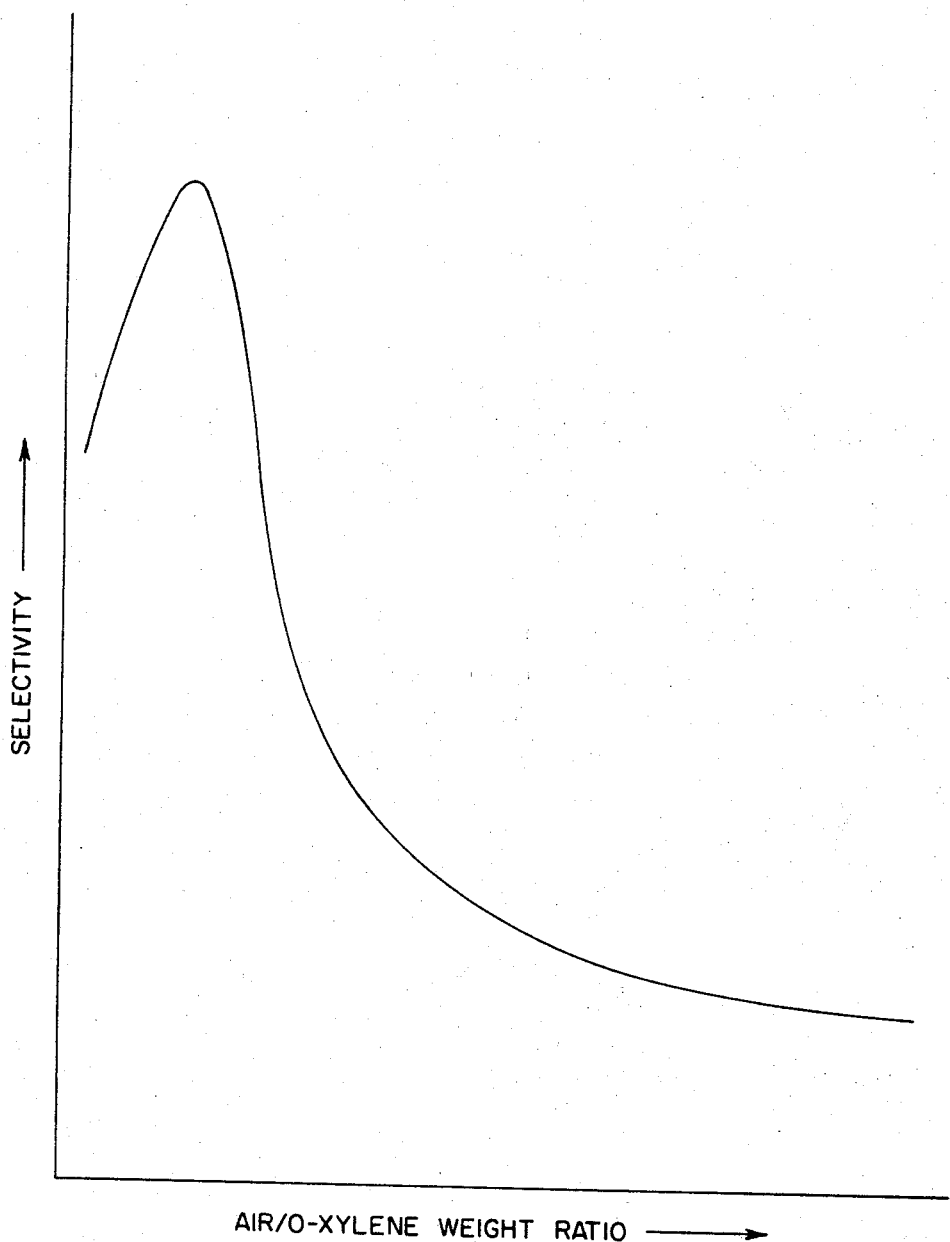

It has been discovered, contrary to other systems for vapor phase oxidation, that optimum results for any particular set of operating conditions are achieved over a relatively narrow range of air to o-xylene ratios, the absolute value of which depends on the amount of bromine used, catalyst properties, temperature and scale of operation. FIG. 3 shows a characteristic plot of selectivity against air to o-xylene ratio under a particular set of conditions. The peak shifts substantially to the right or left and up and down and varies in sharpness depending on the operating conditions. However, in no case has the peak occurred with an air to o-xylene ratio below 8 or above 17. The relatively low air to o-xylene ratios made possible by the present invention are an important advantage because the cost of plant installation and operation are directly related to the amount of air required.

Group 2

The aforesaid examples of Group 1 were repeated except that the following catalysts having the following compositions and properties listed in Table 1 and Table 2 were used. All these catalysts fall within the class of catalysts contemplated by the invention.

TABLE 1

|  | Properties | | | |
|---|---|---|---|---|
|  | Catalyst 1 | Catalyst 2 | Catalyst 3 | Catalyst 4 |
| Silica Support [1] | "D" | "A" | "A" | "G-2" |
| Components (weight percent): | | | | |
| $SiO_2$ Support | 56.4 | 48.1 | 47.8 | 52.5 |
| $UO_3$ | 0.7 | | | 0.5 |
| $P_2O_5$ | 4.7 | 2.0 | 2.0 | 1.7 |
| $V_2O_5$ | 6.1 | 7.7 | 7.7 | 7.0 |
| $K_2O$ | 11.9 | 16.2 | 16.2 | 14.5 |
| $SO_3$ | 20.2 | 25.9 | 25.8 | 23.2 |
| $Ag_2O$ | | 0.1 | | |
| $Ce_2O_3$ | | | 0.5 | |
| $MoO_3$ | | | | 0.6 |
| Total | 100.0 | 100.0 | 100.0 | 100.0 |
| Mol Ratios: | | | | |
| $SO_3/K_2O$ | 1.99 | 1.88 | 1.88 | 1.88 |
| $SO_3+P_2O_5/K_2O$ | 2.77 | 2.12 | 2.12 | 2.12 |
| $K_2O/V_2O_5+UO_3+MoO_3$ | 3.54 | 4.04 | 4.04 | 3.52 |

[1] Physical characteristics of silica gel catalyst support identified by letters are referred to in Table 2 below.

TABLE 2

| Support | Bulk Density, gm./cc. | Surface Area, m.²/gm. | Pore Volume, cc./gm. | Pore Diameter, A. |
|---|---|---|---|---|
| "D" (crushed) | 0.45 | 600 | 0.60 | 44 |
| "A" (micro-spheroidal) | 0.45 | 580 | 0.89 | 61 |
| "G-2" (micro-spheroidal) | 0.55 | 775 | 0.61 | 32 |

In each case, the selectivity and yield compared favorably with those achieved in the Group 1 examples except that at bromine concentrations below 1% the yield and selectivity were less in varying degrees. However, in all cases, the use of bromine improved yield and selectivity.

Group 3

The aforesaid examples of Group 1 were repeated except that in one set of runs, HBr was used in place of bromine, in another set of runs, ethylene dibromide was used and in still another set of runs, xylyl bromide was used. Also, fewer temperatures were used. HBr gave results essentially the same as elemental bromine. Ethylene dibromide improved yield and selectivity but the improvement was much less as compared to elemental bromine and HBr. It was found that in order to obtain optimum improvement with ethylene dibromide, almost six times as much combined bromine was required as compared to elemental bromine, and even then, the optimum yield was 10 to 15% less than with elemental bromine and HBr.

It is believed that the ethylene dibromide effectiveness is restricted by the fact that more time and a higher temperature are required to make the bromine available as a promoter.

Xylyl bromide in lesser amounts than ethylene dibromide but in greater amounts than HBr gave poorer results than ethylene dibromide or HBr.

We claim:

1. A method for the vapor phase, catalytic oxidation of o-xylene to phthalic anhydride comprising reacting said o-xylene with an oxygen containing gas in a fluidized bed of a supported catalyst in the presence in the vapor phase of a promoter of the group consisting of bromine, HBr and a bromine compound which is capable of dissociation into bromine or HBr under reactor conditions, said catalyst consisting essentially of vanadium oxides fluxed with a compound of $SO_3$ and alkali metal oxide, the support of said supported catalyst consisting essentially of highly porous silica gel, said silica gel to which said catalyst is applied having a surface area of not substantially less than 450 m.$^2$/gram and a mean pore diameter greater than 25 Angstrom and less than 100 Angstrom.

2. A method according to claim 1, the molar ratio in said catalyst of alkali metal oxide to said vanadium oxides plus oxides of other valence changing metals included in groups V–b and VI–b of the Periodic Table Of Elements and uranium being not substantially less than 3.3 and not substantially greater than 5.2.

3. A method according to claim 1, the molar ratio of $SO_3$ to alkali metal oxide being less than 2.2 in the equilibrium catalyst.

4. A method according to claim 1, the reaction temperature being not substantially greater than 750° F., said oxygen-containing gas being air, the ratio of air to o-xylene being not substantially greater than 20 to 1 and not substantially less than 7.5 to 1, said alkali metal oxide consisting essentially of $K_2O$.

5. A method according to claim 4, said promoter being selected from the group consisting of bromine and HBr, the amount of said promoter being between about 0.1 and 5.0% by weight based on the o-xylene.

6. A method according to claim 1, said silica gel to which said catalyst is applied having a mean pore diameter between 30 and 90 A. and a surface area between about 600 and 800 m.$^2$/gram.

7. A method according to claim 1, said supported catalyst being one which has been formed by applying the catalyst to solid particles of the silica, said supported catalyst after reaching equilibrium under reactor conditions having a surface area greater than about 100 square meters per gram and a pore volume of not less than about 0.3 cc. per gram.

8. A method according to claim 1, said supported catalyst being one which has been formed by adding the catalyst to the silica prior to its formation into solid particles, said supported catalyst after reaching equilibrium under reactor conditions having a surface area greater than about 45 m.$^2$/gram and a pore volume of not less than about 0.25 cc. per gram.

9. A method according to claim 1, said supported catalyst being one which has been formed by applying the catalyst to solid particles of silica, the amount of catalyst being not substantially greater than 45% by weight of the catalyst and support.

10. A method according to claim 1, said supported catalyst being one which has been formed by adding the catalyst to the silica prior to its formation into solid particles, the amount of catalyst being not substantially greater than 55% by weight of the catalyst and support.

11. A method according to claim 1, in which between about 15 and 30% by weight of the equilibrium supported catalyst is less than 40 microns in size.

12. A method according to claim 11, said silica gel to which said catalyst is applied having a bulk density of between 0.3 and 0.6 gram per cc.

13. A method according to claim 1, said equilibrium catalyst containing vanadium oxides in which the vanadium is in pentavalent and tetravalent form, between about 20 and 60% by weight of said vanadium being maintained in pentavalent form.

14. A method according to claim 1, the rate of o-xylene feed per pound of supported catalyst per hour being not substantially less than 0.025 pound with o-xylene conversion greater than 95%.

References Cited

UNITED STATES PATENTS 3,210,378  10/1965  Nonnenmacher et al.  260—346.4

OTHER REFERENCES

Emmett, Paul H. Catalysis, N.Y. Reinhold, 1960, p. 215, QD501, E58 (Group 120).

NICHOLAS S. RIZZO, *Primary Examiner.*

B. DENTZ, *Assistant Examiner.*